United States Patent
Goyal et al.

(10) Patent No.: US 10,437,233 B2
(45) Date of Patent: Oct. 8, 2019

(54) DETERMINATION OF TASK AUTOMATION USING NATURAL LANGUAGE PROCESSING

(71) Applicant: Accenture Global Solutions Limited, Dublin (IE)

(72) Inventors: Jitesh Goyal, Dublin (IE); Carl Sharpe, Dublin (IE); Anthony McCoy, Dublin (IE); Ajitesh Prakash, Dublin (IE)

(73) Assignee: Accenture Global Solutions Limited, Dublin (IE)

( * ) Notice: Subject to any disclaimer, the term of this patent is extended or adjusted under 35 U.S.C. 154(b) by 196 days.

(21) Appl. No.: 15/655,507

(22) Filed: Jul. 20, 2017

(65) Prior Publication Data
US 2019/0025800 A1    Jan. 24, 2019

(51) Int. Cl.
*G06F 17/20* (2006.01)
*G05B 19/4155* (2006.01)
*G06F 17/27* (2006.01)

(52) U.S. Cl.
CPC ....... *G05B 19/4155* (2013.01); *G06F 17/278* (2013.01); *G06F 17/2785* (2013.01); *G05B 2219/31368* (2013.01)

(58) Field of Classification Search
None
See application file for complete search history.

(56) References Cited

U.S. PATENT DOCUMENTS

| 6,882,723 | B1 | 4/2005 | Peterson et al. |
| 2002/0144142 | A1 | 10/2002 | Shohat |
| 2003/0139956 | A1 | 7/2003 | Guenther et al. |
| 2009/0157619 | A1* | 6/2009 | Oates ............... G06Q 10/00 |
| 2011/0301996 | A1* | 12/2011 | Johnson ............ G06Q 10/06 705/7.26 |
| 2013/0174171 | A1* | 7/2013 | Doster ............... G06F 9/4881 718/102 |

(Continued)

OTHER PUBLICATIONS

Frey et al., "The Future of Employment: How Susceptible Are Jobs to Computerisation?", http://www.oxfordmartin.ox.ac.uk/downloads/academic/The_Future_of_Employment.pdf, Sep. 17, 2013, 72 pages.

(Continued)

*Primary Examiner* — Paul B Yanchus, III
(74) *Attorney, Agent, or Firm* — Harrity & Harrity, LLP

(57) ABSTRACT

A device may receive information associated with an entity-specific designation of a role, and determine a standardized designation of the role that corresponds to the entity-specific designation of the role after comparing the information associated with the entity-specific designation of the role and information associated with a set of standardized designations of roles. The device may receive information associated with a set of tasks that is associated with the role, and compare the information associated with the set of tasks and information associated with a set of automation-capable tasks. The device may determine a set of automation scores associated with the set of tasks, and provide information associated with the set of automation scores to permit an action to be performed based on the set of automation scores.

20 Claims, 9 Drawing Sheets

(56) References Cited

U.S. PATENT DOCUMENTS

2016/0086126 A1* 3/2016 Ashikawa ...... G06Q 10/063112
 705/7.14

OTHER PUBLICATIONS

"Skill: A System for Skill Identification and Normalization", Proceedings of the Twenty-Seventh Conference on Innovative Applications of Artificial Intelligence 4012, 2015, https://www.aaai.org/ocs/index.php/IAAI/IAAI15/paper/view/9363/9907, 6 pages.

* cited by examiner

DETERMINATION OF TASK AUTOMATION USING NATURAL LANGUAGE PROCESSING

BACKGROUND

Automation can refer to the use of various control systems for operating equipment, performing tasks, operating vehicles, and/or the like, with minimal or no human intervention. Automation is achieved by various devices, such as mechanical devices, hydraulic devices, pneumatic devices, electrical devices, electronic devices, computing devices, and/or the like. Complicated systems, such as modern factories, airplanes, ships, and/or the like, typically use such devices. Automation conserves labor, energy, materials, and/or the like, and improves quality, accuracy, precision, and/or the like.

SUMMARY

According to some possible implementations, a device may include one or more processors to receive information associated with an entity-specific designation of a role; compare the information associated with the entity-specific designation of the role and information associated with a set of standardized designations of a set of roles; determine a standardized designation of the role, of the set of standardized designations, that corresponds to the entity-specific designation of the role after comparing the information associated with the entity-specific designation of the role and the information associated with the set of standardized designations of the set of roles; receive information associated with a set of tasks that is associated with the role after determining the standardized designation of the role that corresponds to the entity-specific designation of the role; compare the information associated with the set of tasks and information associated with a set of automation-capable tasks; determine a set of automation scores, associated with the set of tasks, based on comparing the information associated with the set of tasks and the information associated with the set of automation-capable tasks; and provide information associated with the set of automation scores to permit an action to be performed based on the set of automation scores.

According to some possible implementations, a method may include receiving, by a device, information associated with a first designation of a role; comparing, by the device, the information associated with the first designation of the role and information associated with a set of other designations of a set of other roles; determining, by the device, a second designation of the role that corresponds to the first designation of the role after comparing the information associated with the first designation of the role and the information associated with the set of other designations of the set of other roles; receiving, by the device, information associated with a set of tasks that is associated with the second designation of the role after determining the second designation of the role that corresponds to the first designation of the role; comparing, by the device, the information associated with the set of tasks and information associated with a set of automation-capable tasks; determining, by the device, a set of automation scores, associated with the set of tasks, based on comparing the information associated with the set of tasks and the information associated with the set of automation-capable tasks; and providing, by the device, information associated with the set of automation scores to permit an action to be performed based on the set of automation scores.

According to some possible implementations, a non-transitory computer readable medium may store one or more instructions that, when executed by one or more processors, cause the one or more processors to receive information associated with a first designation of a role; compare the information associated with the first designation of the role and information associated with a set of other designations of a set of other roles; determine a second designation of the role that corresponds to the first designation of the role after comparing the information associated with the first designation of the role and the information associated with the set of other designations of the set of other roles; receive information associated with a set of tasks that is associated with the second designation of the role after determining the second designation of the role that corresponds to the first designation of the role; compare the information associated with the set of tasks and information associated with a set of automation-capable tasks; determine a set of automation scores, associated with the set of tasks, based on comparing the information associated with the set of tasks and the information associated with the set of automation-capable tasks; and provide information associated with the set of automation scores to permit an action to be performed based on the set of automation scores.

DETAILED DESCRIPTION

The following detailed description of example implementations refers to the accompanying drawings. The same reference numbers in different drawings may identify the same or similar elements.

An entity (e.g., a business, an organization, and/or the like) is usually associated with a set of roles and personnel that perform tasks associated with the set of roles. For example, a business might have senior leadership officers, managers, directors, engineers, developers, marketing specialists, and/or the like. Different roles might be associated with different tasks. As an example, a chief legal officer might be responsible for performing particular tasks, whereas an engineer might be responsible for performing other tasks. As the capabilities of artificial intelligence and automation become more robust, it may be desirable to identify particular roles and/or tasks that might utilize such capabilities.

Some implementations described herein provide an analytics platform that may receive a first textual description of a role of an entity (e.g., a job title that might be specific to an entity), and implement a set of natural language processing (NLP) techniques to determine a second textual description of the role that corresponds to the same underlying role. Additionally, the analytics platform may determine, using the second textual description of the role and a set of NLP techniques, textual descriptions of a set of tasks that is associated with the role (e.g., responsibilities, duties, skills, and/or the like). Additionally, the analytics platform may receive information associated with textual descriptions of a set of automation-capable tasks (e.g., tasks that may be performed, augmented, and/or the like, using automation technology).

Additionally, the analytics platform may compare, using a set of NLP techniques, the textual descriptions of the set of tasks and the textual descriptions of the set of automation-capable tasks. Additionally, the analytics platform may determine, based on the comparison, a set of automation scores that identifies the potential, the capability, the efficacy, and/or the like, of the set of tasks being automated through the usage of automation technology. In this way, the analytics platform may identify particular tasks and/or roles of an entity that might be ripe for automation, that might be assisted through automation, and/or the like.

FIGS. 1A-1F are diagrams of an overview of an example implementation 100 described herein. Assume that an operator associated with an entity wishes to identify particular roles associated with the entity that might benefit from the usage of automation technology, such as hardware, firmware, software, and/or a combination thereof that permits automation of particular tasks.

Figure 1A:
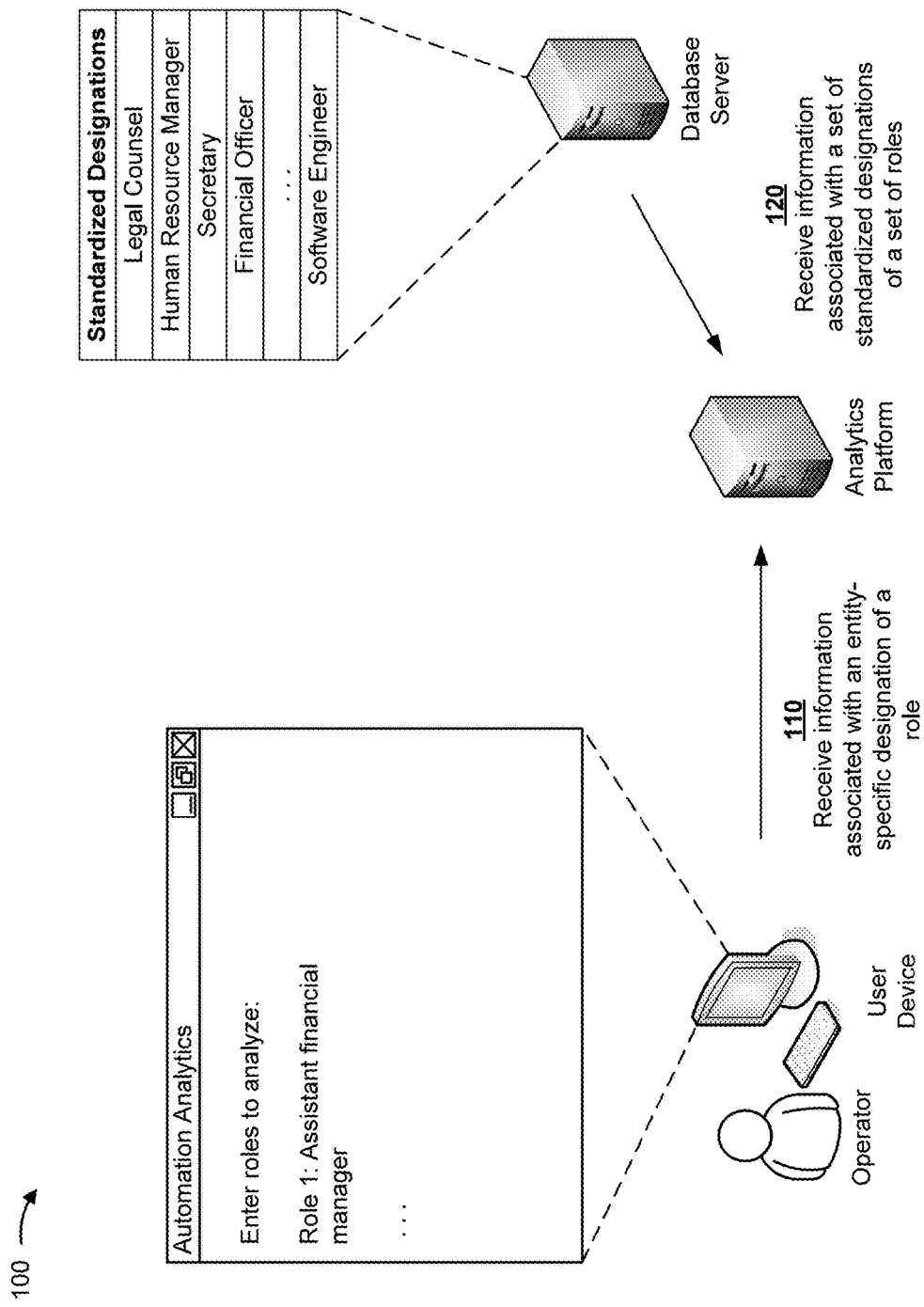
FIGS. 1A-1F are diagrams of an overview of an example implementation described herein.

As shown in FIG. 1A, and by reference number 110, an analytics platform may receive, from a user device associated with the operator, information associated with an entity-specific designation of a role. For example, the operator may interact with the user device to input an entity-specific designation associated with a particular role of the entity for which automation capability is to be analyzed. As used herein, an entity-specific designation of a role may refer to a designation of a role that might be specific to a particular entity, that might not be used by other entities, that might not be used by a majority of other entities, and/or the like. For example, the designation "assistant financial manager" might be specific to the entity. In other words, different entities might refer to a same underlying role using different designations.

While a single entity-specific designation of a role is shown in FIG. 1A, it should be understood that, in practice, the analytics platform may process thousands, millions, billions, etc. of entity-specific designations of roles and/or tasks. As such, the analytics platform may perform one or more big data processing techniques to efficiently process such a large quantity of data, which is incapable of being processed manually.

As further shown in FIG. 1A, and by reference number 120, the analytics platform may receive, from a database server, information associated with a set of standardized designations of a set of roles. In some implementations, a database may store information associated with a list of standardized designations of a set of roles, and tasks associated with the standardized designations. As such, the analytics platform may perform role matching to determine a standardized designation that corresponds to an entity-specific designation, such that the database may be used to determine tasks, as described elsewhere herein.

For example, the standardized designations "legal counsel," "human resource manager," "secretary," and/or the like, may be stored by the database.

In this way, the analytics platform may compare the entity-specific designation of the role and the set of standardized designations to determine a standardized designation of the role that corresponds to the entity-specific designation of the role, as described below.

Figure 1B:
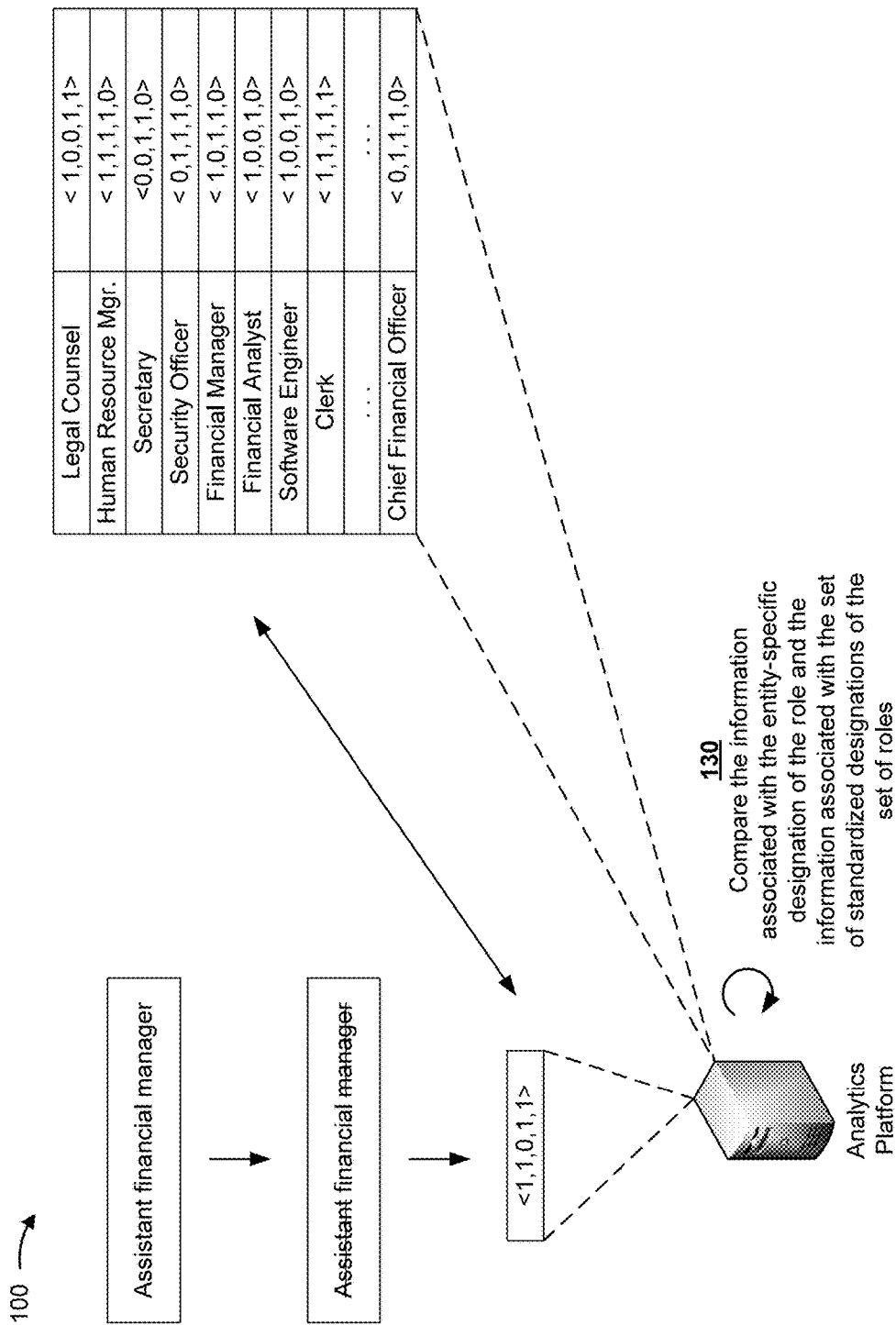

As shown in FIG. 1B, and by reference number 130, the analytics platform may compare the information associated with the entity-specific designation of the role and the information associated with the set of standardized designations of the set of roles. For example, the analytics platform may perform the comparison to determine a standardized designation that refers to the same underlying role as the entity-specific designation.

As shown, the analytics platform may remove particular words from the entity-specific designation of the role before performing the comparison. For example, the analytics platform may remove the words "assistant" and "manager" because the words may not be of much significance for role matching purposes. In other words, multiple different roles may include the word "manager" and/or may include the word "assistant" (e.g., a financial manager, a human resource manager, a security manager, an executive assistant, a marketing assistant, a legal assistant, and/or the like).

The analytics platform may generate a vector (e.g., <1,1, 0,1,1>) using the entity-specific designation of the role and a word embedding technique. Additionally, the analytics platform may generate a set of vectors that corresponds to the set of standardized designations of the set of roles. The analytics platform may compare the vector, associated with the entity-specific designation of the role, and the vectors of the standardized designations of the set of roles. Additionally, the analytics platform may determine a set of similarity values (e.g., cosine similarity values, hamming distance values, and/or the like) based on performing the comparisons. In this way, the analytics platform may determine a preliminary match corpus, such as a set of standardized designations that includes standardized designations that are identified as being more similar to the entity-specific designation than as compared to other standardized designations based on respective similarity values.

Figure 1C:
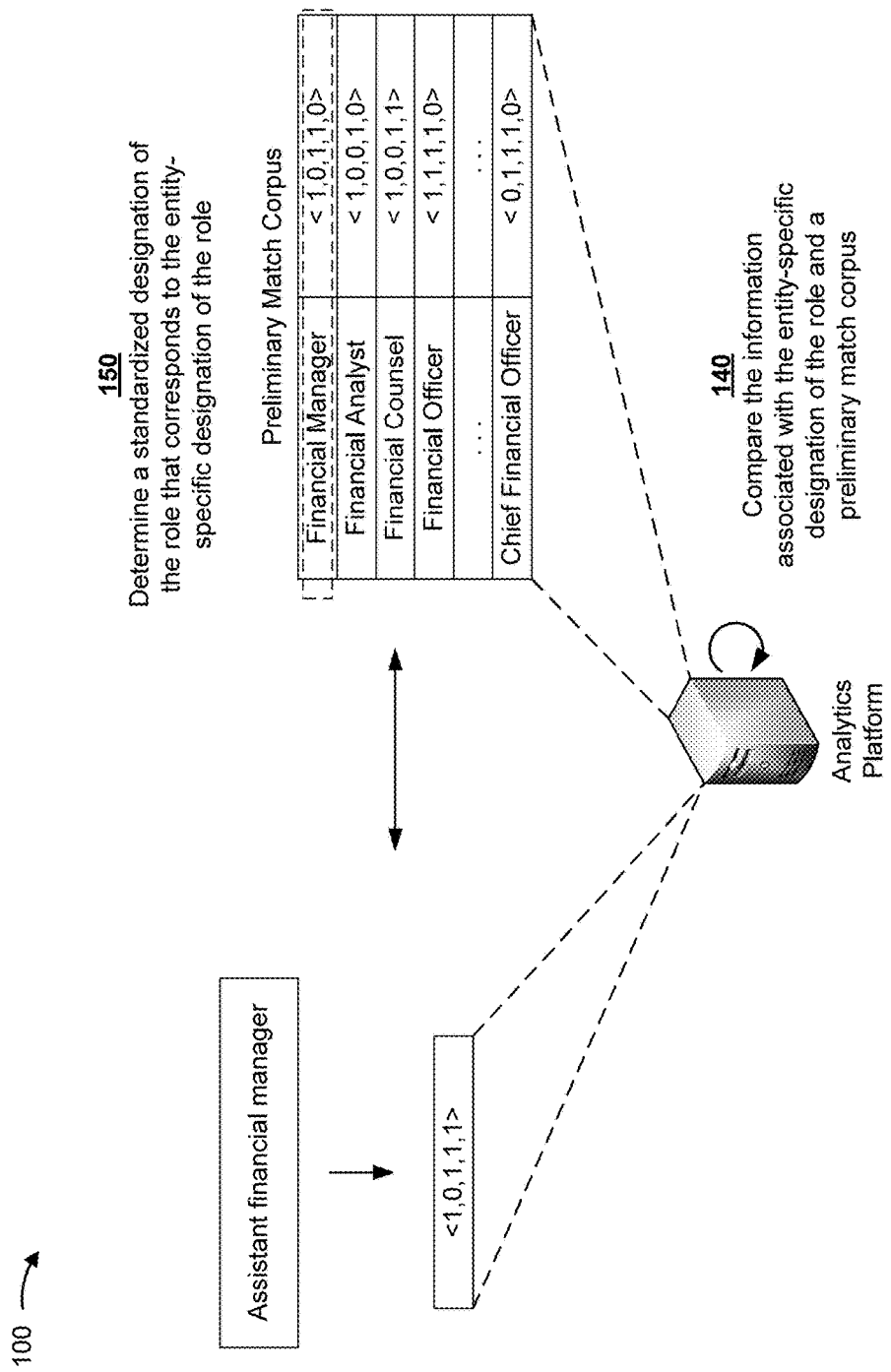

As shown in FIG. 1C, and by reference number 140, the analytics platform may compare the information associated with the entity-specific designation of the role and a preliminary match corpus. As shown, the preliminary match corpus may include standardized designations, such as "financial manager," "financial analyst," "financial counsel," and/or the like.

As shown, the analytics platform may generate another vector that corresponds to the entity-specific designation of the role that includes the words "assistant" and "manager," and may compare the vector and vectors of the preliminary match corpus. By generating another vector that includes the words "manager" and/or "assistant," the analytics platform may increase the accuracy of determining a match between the entity-specific designation of the role and a standardized designation. In other words, while the words "manager" and "assistant" may not have been of importance when determining the preliminary match corpus (e.g., because multiple different roles might include those words), the words may be of increased importance when determining a particular standardized designation that corresponds to the entity-specific designation of the role (e.g., because a financial manager might perform different tasks than as compared to a financial analyst).

As further shown in FIG. 1C, and by reference number 150, the analytics platform may determine a standardized designation of the role that corresponds to the entity-specific designation of the role. For example, the analytics may determine, based on comparing vectors, that the standardized designation "financial manager" includes the greatest similarity value as compared to similarity values of the other standardized designations associated with the preliminary match corpus. In this way, the analytics platform may determine that the entity-specific designation "assistant financial manager" and the standardized designation "financial manager" refer to the same underlying role. By identifying the standardized designation of the role, the analytics platform may determine tasks that are associated with the role, as described below.

Figure 1D:
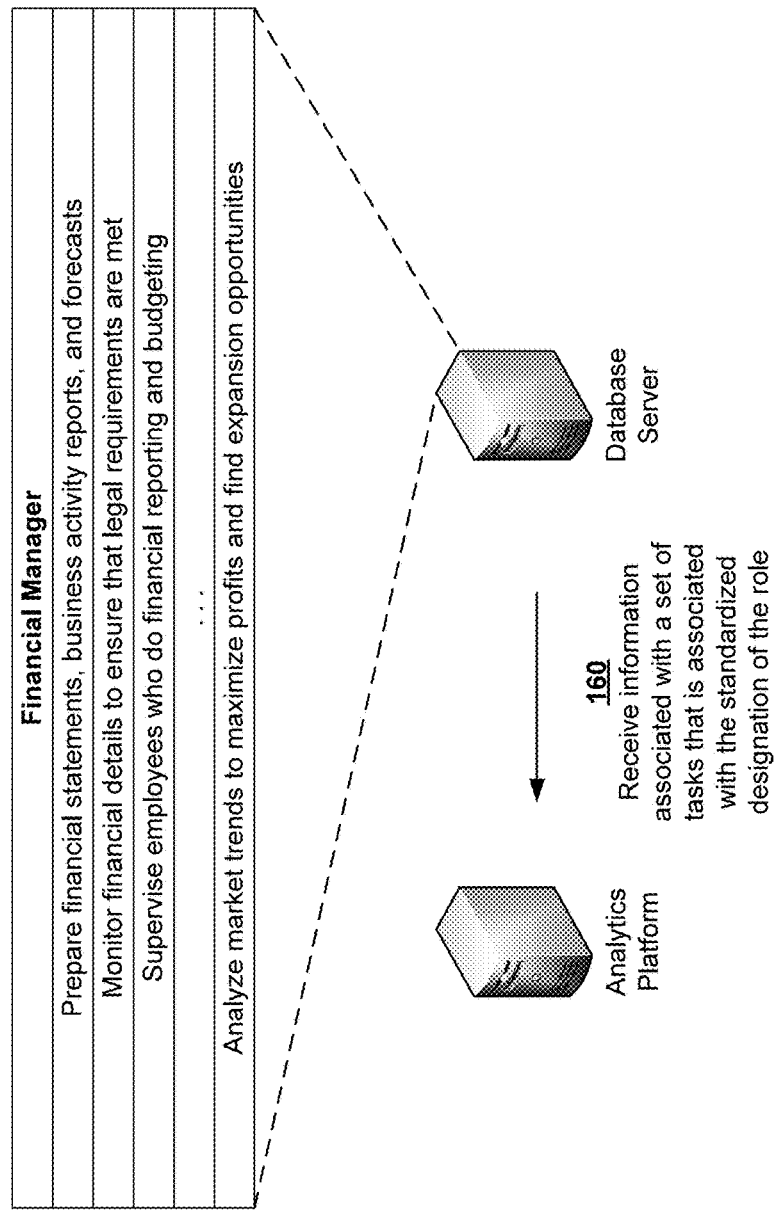

As shown in FIG. 1D, and by reference number 160, the analytics platform may receive information associated with a set of tasks that is associated with the standardized designation of the role. For example, the analytics platform may receive textual descriptions of tasks that correspond to the role of a financial manager. By determining the standardized designation of the role, the analytics platform may receive the information associated with the set of tasks. In other words, the database server may store information associated with sets of tasks of roles, and the information may be mapped to standardized designations of the roles. Put another way, the analytics platform might not be capable of identifying tasks associated with a role using an entity-specific designation of the role.

Figure 1E:
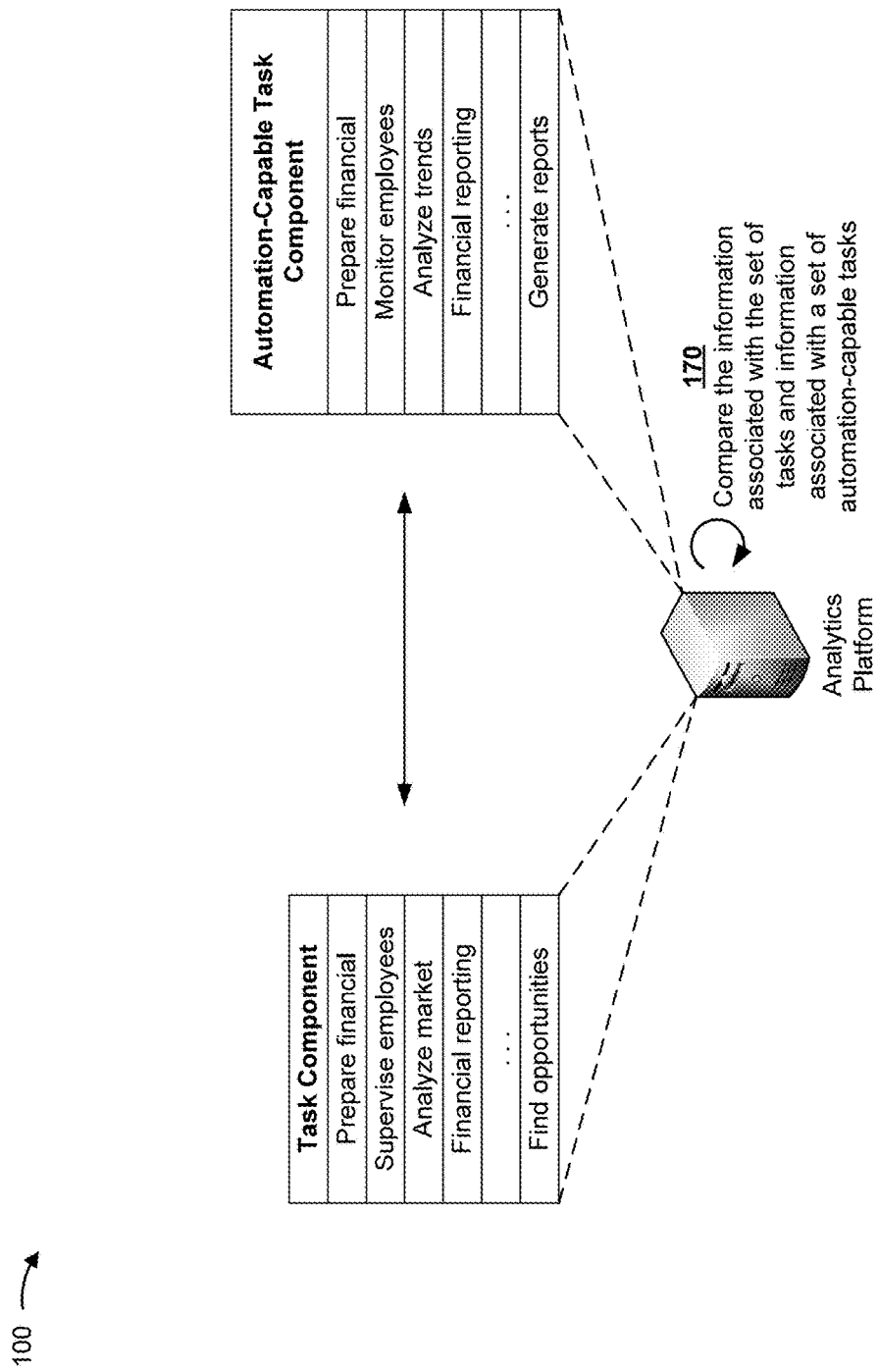

As shown in FIG. 1E, and by reference number 170, the analytics platform may compare the information associated with the set of tasks and information associated with a set of automation-capable tasks. As used herein, an automation-capable task may refer to a task that is capable of being performed using automation technology, capable of being assisted using automation technology, and/or the like.

The analytics platform may generate a set of task components (e.g., unigrams, bigrams, trigrams, etc.) using the information associated with the set of tasks. For example, as shown, the analytics platform may generate the bigrams "prepare financial," "supervise employees," "analyze market," and/or the like, using the textual descriptions of the set of tasks. Additionally, the analytics platform may generate a set of automation-capable task components using the information associated with the set of automation-capable tasks. The analytics platform may generate vectors for the set of task components and the set of automation-capable task components, and compare the vectors. By comparing vectors on a component basis, the analytics platform improves an accuracy of automation score determination than as compared to situations where the analytics platform compares tasks using an entire set of words associated with the tasks.

Figure 1F:
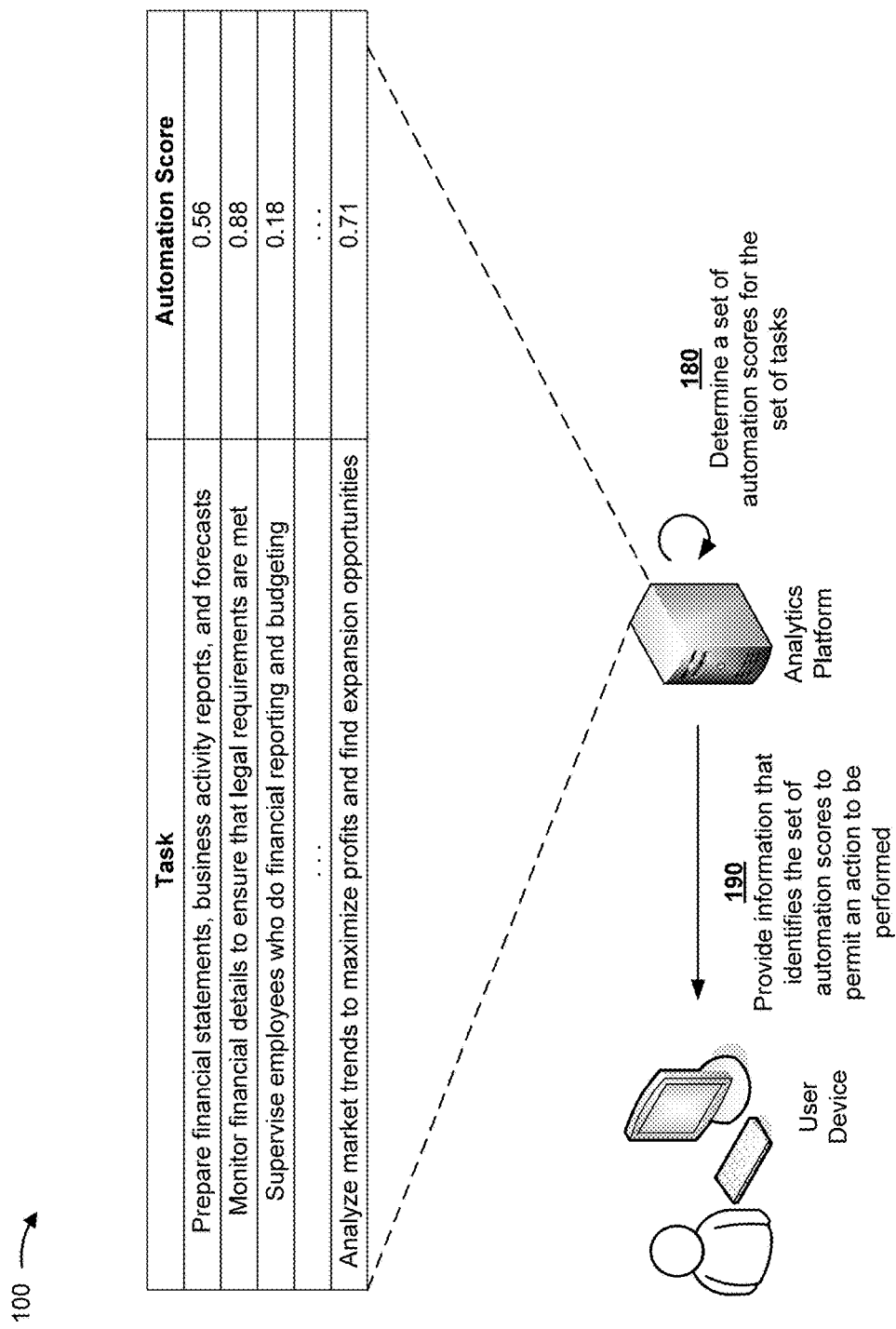

As shown in FIG. 1F, and by reference number 180, the analytics platform may determine a set of automation scores for the set of tasks. As used herein, an automation score may refer to a score, a value, a designation, and/or the like, that identifies the capability, the probability, the viability, and/or the like, of a task being automated and/or being assisted through the usage of automation technology. As described in more detail elsewhere herein, the analytics platform may determine the automation scores using similarity values between task components and automation-capable task components, a model, a technique, and/or the like. As shown, and as an example, the automation score of 0.71 for the task of analyzing market trends to maximize profits and find expansion opportunities may indicate that the task is more capable of being automated than as compared to another task that includes a lower automation score, such as the task of supervising employees who do financial reporting and budgeting.

As further shown in FIG. 1F, and by reference number 190, the analytics platform may provide information that identifies the set of automation scores to permit an action to be performed. For example, the analytics platform may provide, to the user device, information associated with the automation scores to permit the user device to provide the information for display. In other implementations, the analytics platform may automatically cause an action to be performed, such as by requesting a product and/or service associated with an automation technology, modifying a budget to accommodate automation technology, modifying a job schedule, modifying a hiring process, sending a message, scheduling a meeting, and/or the like.

Some implementations described herein improve the speed and/or accuracy of data correlation (e.g., role matching and/or task matching using NLP techniques) and/or remove subjectivity associated with data correlation by performing a first comparison using a first vector associated with a role, and performing a second comparison using a second vector associated with the role. For example, by using the first vector, the analytics platform can identify a preliminary match corpus of standardized designations and/or disregard other non-similar standardized designations. Additionally, the analytics platform may disregard sets of words when generating the first vector, such as words that may be prevalent in various different types of roles. By comparing the second vector and vectors associated with the preliminary match corpus, the analytics platform may increase the accuracy of role matching by utilizing a set of words that might be applicable to a particular role.

By comparing tasks on a component basis, the analytics platform may increase the accuracy of task matching, and may remove subjectivity associated with task matching. For example, comparing bigrams, trigrams, and/or the like, increases an accuracy of task matching as compared to comparing tasks on a sentence level, and/or the like.

By identifying tasks, of a role, that might benefit from automation, the analytics platform may improve task efficiency, conserve device resources, reduce manual effort, reduce error, remove subjectivity associated with performing tasks, and/or the like.

In this way, some implementations described herein conserve processor and/or memory resources of devices associated with data correlation. For example, by using NLP techniques, implementations described herein remove manual effort associated with data correlation, reduce subjectivity, reduce an amount of time associated with data correlation, and/or the like. Additionally, implementations described herein permit data correlation using thousands, millions, billons, etc. of data points associated with roles and/or tasks. In this way, implementations described herein permit data correlation that is not capable of being performed manually by a human operator.

As indicated above, FIGS. 1A-1F are provided merely as an example. Other examples are possible and may differ from what was described with regard to FIGS. 1A-1F.

Figure 2:
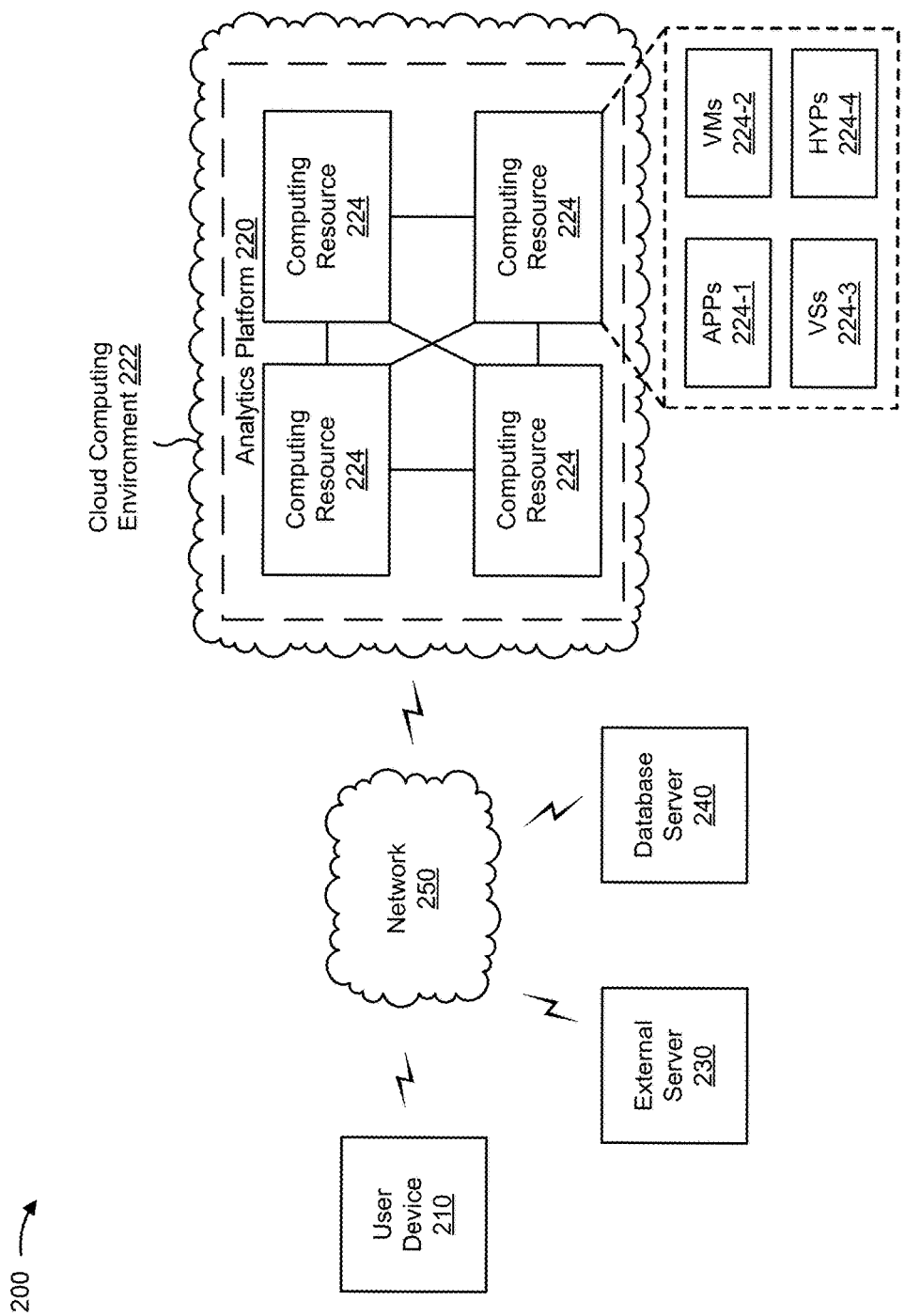
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, an analytics platform 220, an external server 230, a database server 240, and a network 250. Devices of environment 200 may interconnect via wired connections, wireless connections, or a combination of wired and wireless connections.

User device 210 includes one or more devices capable of receiving, generating, storing, processing, and/or providing information associated with analytics platform 220. For example, user device 210 may include a device, such as a desktop computer, a laptop computer, a tablet computer, a handheld computer, a server device, a mobile phone (e.g., a smart phone or a radiotelephone), a wearable communication device (e.g., a smart wristwatch, an activity band, or a pair of smart eyeglasses), a gaming device, or a similar type of device.

Analytics platform 220 includes one or more devices capable of determining automation scores using NLP techniques. In some implementations, analytics platform 220 may be designed to be modular such that certain software components can be swapped in or out depending on a particular need. As such, analytics platform 220 may be easily and/or quickly reconfigured for different uses.

Some implementations herein describe models. In some implementations, analytics platform 220 may use machine learning techniques to analyze data (e.g., training data, such as historical data, etc.) and create models. The machine learning techniques may include, for example, supervised and/or unsupervised techniques, such as artificial networks, Bayesian statistics, learning automata, Hidden Markov Modeling, linear classifiers, quadratic classifiers, decision trees, association rule learning, and/or the like.

In some implementations, analytics platform 220 may use another kind of computer-implemented technique, such as artificial intelligence, machine perception, or computer vision, to analyze data and generate models.

In some implementations, as shown, analytics platform 220 may be hosted in a cloud computing environment 222. Notably, while implementations described herein describe analytics platform 220 as being hosted in cloud computing environment 222, in some implementations, analytics platform 220 may not be cloud-based (i.e., may be implemented outside of a cloud computing environment) or may be partially cloud-based.

Cloud computing environment 222 includes an environment that hosts analytics platform 220. Cloud computing environment 222 may provide computation, software, data access, storage, etc. services that do not require end-user (e.g., user device 210) knowledge of a physical location and configuration of system(s) and/or device(s) that hosts analytics platform 220. As shown, cloud computing environment 222 may include a group of computing resources 224 (referred to collectively as "computing resources 224" and individually as "computing resource 224").

Computing resource 224 includes one or more personal computers, workstation computers, server devices, or other types of computation and/or communication devices. In some implementations, computing resource 224 may host analytics platform 220. The cloud resources may include compute instances executing in computing resource 224, storage devices provided in computing resource 224, data transfer devices provided by computing resource 224, etc. In some implementations, computing resource 224 may communicate with other computing resources 224 via wired connections, wireless connections, or a combination of wired and wireless connections.

As further shown in FIG. 2, computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, and/or the like.

Application 224-1 includes one or more software applications that may be provided to or accessed by user device 210. Application 224-1 may eliminate a need to install and execute the software applications on user device 210. For example, application 224-1 may include software associated with analytics platform 220 and/or any other software capable of being provided via cloud computing environment 222. In some implementations, one application 224-1 may send/receive information to/from one or more other applications 224-1, via virtual machine 224-2.

Virtual machine 224-2 includes a software implementation of a machine (e.g., a computer) that executes programs like a physical machine. Virtual machine 224-2 may be either a system virtual machine or a process virtual machine, depending upon use and degree of correspondence to any real machine by virtual machine 224-2. A system virtual machine may provide a complete system platform that supports execution of a complete operating system ("OS"). A process virtual machine may execute a single program, and may support a single process. In some implementations, virtual machine 224-2 may execute on behalf of a user (e.g., user device 210), and may manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 224-4 may provide hardware virtualization techniques that allow multiple operating systems (e.g., "guest operating systems") to execute concurrently on a host computer, such as computing resource 224. Hypervisor 224-4 may present a virtual operating platform to the guest operating systems, and may manage the execution of the guest operating systems. Multiple instances of a variety of operating systems may share virtualized hardware resources.

External server 230 includes one or more devices, accessible through network 250, that are sources of information that may be used by analytics platform 220. For example, external server 230 may include a server that includes particular information for use by analytics platform 220 and/or user device 210. For example, external server 230 may include a server or a group of servers (e.g., a cloud-based server, an application device, a content server, a host server, a web server, a database server, etc.), a desktop computer, or a similar device.

Database server 240 includes one or more devices capable of receiving, storing, and/or providing information for use by analytics platform 220. For example, database server 240 may include a server or a group of servers. In some implementations, database server 240 may provide, to analytics platform 220, information and/or resources. In some implementations, database server 240 stores information regarding standardized designations of roles and/or tasks associated with the roles. For example, database server 240 may include the O*NET database, or another type of database.

Network 250 may include one or more wired and/or wireless networks. For example, network 250 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
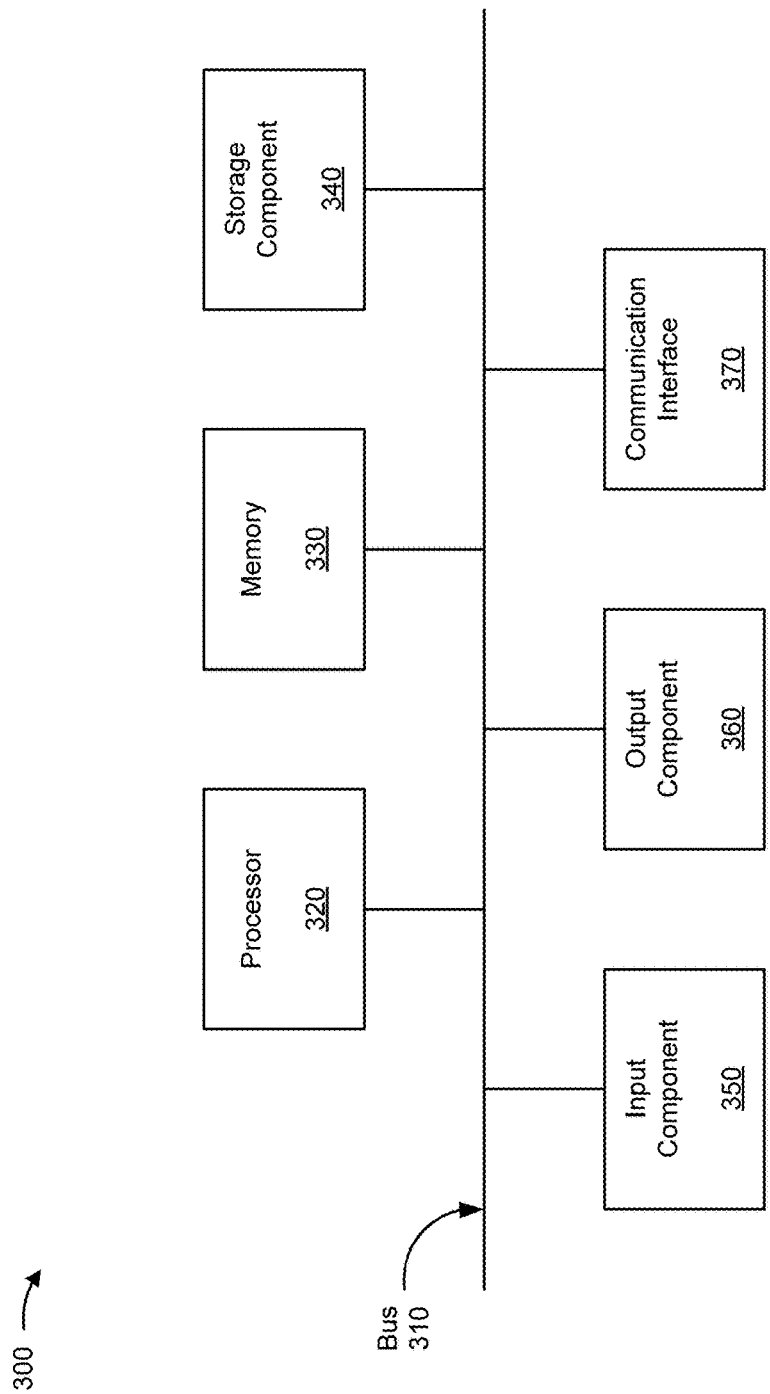
FIG. 3 is a diagram of example components of one or more devices of FIG. 2.

FIG. 3 is a diagram of example components of a device 300. Device 300 may correspond to user device 210, analytics platform 220, computing resource 224, external server 230, and/or database server 240. In some implementations, user device 210, analytics platform 220, computing resource 224, external server 230 and/or database server 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
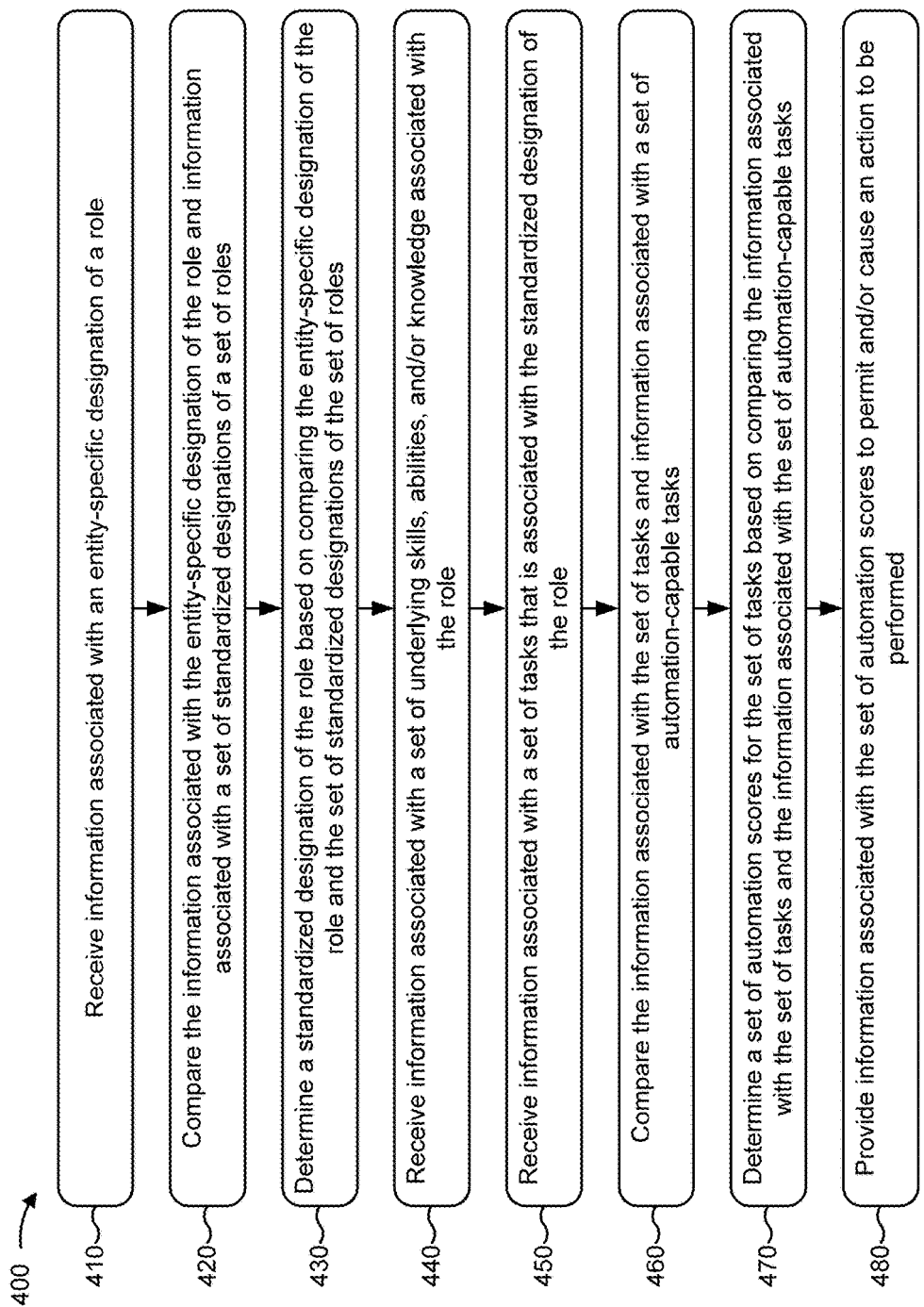
FIG. 4 is a flow chart of an example process for determining automation scores using natural language processing techniques.

FIG. 4 is a flow chart of an example process 400 for determining automation scores using natural language processing techniques. In some implementations, one or more process blocks of FIG. 4 may be performed by analytics platform 220. In some implementations, one or more process blocks of FIG. 4 may be performed by another device or a group of devices separate from or including analytics platform 220, such as user device 210, external server 230, and/or database server 240.

As shown in FIG. 4, process 400 may include receiving information associated with an entity-specific designation of a role (block 410). For example, analytics platform 220 may receive, from user device 210 (e.g., which may have received an input from a user), a designation, associated with a role, that is being used by an entity in association with the role.

In some implementations, analytics platform 220 may receive information associated with an entity-specific designation of a role, such that analytics platform 220 may determine automation scores associated with tasks of the role, as described elsewhere herein. While implementations herein describe receiving information associated with a particular entity-specific designation of a role, it should be understood that, in practice, analytics platform 220 may receive and process information associated with thousands, millions, billions, etc. of entity-specific designations of roles (e.g., an amount of data that is incapable of being processed manually).

In some implementations, an entity (e.g., a business, an organization, a group of individuals, a company, and/or the like) may include a set of roles (e.g., jobs, positions, responsibilities, and/or the like). In some implementations, an individual (e.g., an employee, a member, and/or the like) may include a particular role and may perform particular tasks, incur particular responsibilities, use particular skills, and/or the like, that correspond to the particular role. As an example, a software developer may write code, maintain code, perform regression tests, and/or the like.

In some implementations, a designation of a role may refer to an identifier, a title, a name, a description, a reference, and/or the like, of a role. As an example, designations may include "legal counsel," "chief executive officer," "financial manager," "financial analyst," "engineer," "developer," "human resource manager," "secretary," "senior vice president," etc.

In some implementations, an entity-specific designation of a role may refer to a designation of a role that might be specific to a particular entity, that might not be used by other entities, that might not be used by a majority of other entities, and/or the like. In some implementations, a standardized designation of a role may refer to a designation of a role that might be used by a majority of entities, might be used by more entities than as compared to an entity-specific designation, and/or the like. In some implementations, an entity-specific designation and a standardized designation may refer to a same underlying role. In other words, different entities may use different designations in association with a same underlying role. As an example, a standardized designation of a role might be "software developer," whereas an entity-specific designation of the same role might be "senior code development manager."

In some implementations, analytics platform 220 may receive, from user device 210 (e.g., which may have received an input from a user), information associated with the entity-specific designation of a role. In some implementations, analytics platform 220 may be configured to receive the information associated with the entity-specific designation of the role (without any interaction with user device 210). In some implementations, analytics platform 220 may receive the information based on an input received from user device 210, based on a time frame (e.g., periodically), based on an event, and/or the like.

In some implementations, the information associated with the entity-specific designation of the role may include a resource that includes text (e.g., a document, a webpage, and/or the like). Additionally, or alternatively, the information may include a resource identifier (e.g., a uniform resource identifier (URI), a uniform resource locator (URL), a uniform resource name (URN), a network address, a database address, and/or the like). Additionally, or alternatively, the resource may be associated with a particular file type and/or format (e.g., a hypertext markup language (HTML) file, an extensible markup language (XML) file, a JavaScript object notation (JSON) file, a text file, a comma-separated values (CSV) file, a portable document format (PDF) file, a word processing file, a spreadsheet file, a zipped file, and/or the like). In some implementations, analytics platform 220 may use a technique to standardize the data such that the data is represented in a particular format.

In some implementations, analytics platform 220 may obtain a resource using one or more resource identifiers. For example, analytics platform 220 may receive, from user device 210, information that identifies text and/or a memory location at which the text is stored. In some implementations, analytics platform 220 may be configured to receive and obtain the resource (without any interaction with user device 210). Additionally, or alternatively, analytics platform 220 may perform a technique (e.g., a web crawling technique, a web scraping technique, a data mining technique, a web searching technique, a database searching technique, and/or the like), and receive the information associated with the entity-specific designation of the role based on the technique. In some implementations, analytics platform 220 may provide requests, to external information sources for the information associated with the entity-specific designation of the role.

In some implementations, analytics platform 220 may process the entity-specific designation of the role using a set of NLP techniques. In some implementations, analytics platform 220 may process the entity-specific designation of the role in order to permit analytics platform 220 to perform role matching, and/or to increase an accuracy of role matching. In some implementations, role matching may refer to the process of determining a match between an entity-specific designation of a role and a standardized designation of the role based on a comparison.

In some implementations, analytics platform 220 may expand acronyms included in the entity-specific designation of the role. For example, analytics platform 220 may expand "CEO" to "chief executive officer," expand "HR" to "human resource," expand "SVP" to "senior vice president," and/or the like.

In some implementations, analytics platform 220 may remove stop words included in the entity-specific designation of the role. For example, analytics platform 220 may remove stop words such as "the," "is," "at," "which," "on," and/or the like. In this way, analytics platform 220 may increase accuracy of role matching by removing words that are not of significance, are of less significance than as compared to other words, and/or the like, for role matching purposes.

In some implementations, analytics platform 220 may remove particular words, included in the entity-specific designation of the role, that are associated with a title, a seniority level, a rank, and/or the like. For example, analytics platform 220 may remove particular words such as "manager," "assistant," "analyst," "senior," "junior," "partner," "associate," "counsel," and/or the like. In this way, analytics platform 220 may improve accuracy of role matching by removing a word that might not be indicative of a particular role. As an example, the designations "human resource manager" and "financial manager" both include the word "manager," however, the designations refer to different types of roles. As described elsewhere herein, analytics platform 220 may perform additional role matching including the word that identifies a title, a seniority level, a rank, and/or the like, after performing an initial comparison between the entity-designation of the role and standardized designations of a set of roles.

In this way, analytics platform 220 may receive information associated with an entity-specific designation of a role, and may compare the entity-specific designation of the role and a set of standardized designations of a set of roles to perform role matching, as described below.

As further shown in FIG. 4, process 400 may include comparing the information associated with the entity-specific designation of the role and information associated with a set of standardized designations of a set of roles (block 420). For example, analytics platform 220 may compare the entity-specific designation of the role and a set of standardized designations of a set of roles to determine a standardized designation of the role that corresponds to the entity-specific designation of the role. In other words, analytics platform 220 may perform role matching to identify an underlying role that is identified by the entity-specific designation and a standardized designation.

In some implementations, analytics platform 220 may perform role matching based on receiving the information associated with the entity-specific designation of the role, based on a time frame, based on receiving information that identifies standardized designations of roles, based on an event, and/or the like.

In some implementations, analytics platform 220 may receive, from database server 240, information associated with a set of standardized designations of a set of roles. In some implementations, and as described elsewhere herein, database server 240 may store information that identifies tasks associated with the standardized designations of the set of roles. In other words, a role may be associated with a set of tasks, and database server 240 may store information that maps a standardized designation of a role and the set of tasks. By matching an entity-specific designation of a role and a standardized designation of the role, analytics platform 220 may, using information from database server 240, identify a set of tasks that are associated with the entity-specific designation of the role.

In some implementations, analytics platform 220 may perform role matching by comparing vectors associated with roles. In some implementations, analytics platform 220 may generate a vector that corresponds to the entity-specific designation of the role. For example, analytics platform 220 may implement a technique (e.g., a word embedding technique, a machine learning technique, a modelling technique, and/or the like) to map an entity-specific designation of a role to a vector in a dimensional metric space (e.g., an n-dimensional space, where n=1, 2, 3, 10, etc.).

In some implementations, analytics platform 220 may generate a set of vectors that corresponds to the set of standardized designations of the set of roles. For example, analytics platform 220 may implement a technique to map a standardized designation of a role to a vector. In this way, analytics platform 220 may compare a vector of the entity-specific designation of the role and the set of vectors of the standardized designations of the set of roles to perform role matching.

In some implementations, analytics platform 220 may compare a vector, associated with the entity-specific designation of the role, and a vector associated with a standardized designation of a role. Additionally, analytics platform 220 may determine a similarity value between the vector, associated with the entity-specific designation of the role, and the vector associated with the standardized designation based on comparing respective vectors. For example, a similarity value may refer to a cosine similarity value, a hamming distance value, a Damerau-Levenshtein value, a Euclidean distance value, a Mahalanobis distance value, a Sorensen-Dice coefficient values, and/or the like. In some implementations, a similarity value may identify and/or be representative of a similarity between an entity-specific designation and a standardized designation.

In some implementations, analytics platform 220 may compare the vector, associated with the entity-specific designation of the role, and the set of vectors associated with the set of standardized designations of the set of roles, and may determine a set of similarity values. In this way, analytics platform 220 may determine a standardized designation that corresponds to the role using the set of similarity values, as described below.

As further shown in FIG. 4, process 400 may include determining a standardized designation of the role based on comparing the entity-specific designation of the role and the set of standardized designations of the set of roles (block 430). For example, analytics platform 220 may determine a standardized designation of the role that corresponds to the entity-specific designation of the role using the set of similarity values.

In some implementations, analytics platform 220 may determine a set of standardized designations that are associated with similarity values that satisfy a threshold (e.g., the top five, the top ten, the top twenty, and/or the like, standardized designations). For example, analytics platform 220 may determine a set of standardized designations that are identified as being more similar to the entity-specific designation than as compared to other standardized designations based on respective similarity values. As used herein, the set of standardized designations, that include similarity values that satisfy a threshold, may be referred to as a preliminary match corpus. In other words, a subset, of the set of standardized designations, may be referred to as the preliminary match corpus.

In some implementations, analytics platform 220 may perform additional role matching using the preliminary match corpus. In some implementations, analytics platform 220 may add a set of words, to the entity-specific designation of the role, that was removed from the entity-specific designation of the role when performing the initial role matching. For example, and as described elsewhere herein, analytics platform 220 may have removed words such as "manager," "assistant," "analyst," "senior," "junior," "partner," "associate," "counsel," and/or the like. In some implementations, analytics platform 220 may add the set of words, that was previously removed, to the entity-specific designation of the role, and may generate a vector after adding the set of words to the entity-specific designation of the role.

In some implementations, analytics platform 220 may compare the vector and vectors of standardized designations associated with the preliminary match corpus. As an example, assume that the entity-specific designation of the role is "specialized financial analyst." In this case, analytics platform 220 might have removed the word "analyst," and determined a preliminary match corpus of "financial manager," "financial analyst," "financial planner," "financial advisor," "financial officer," "financial counsel," "financial associate," and/or the like. By adding the word "analyst" to the entity-specific designation of the role, and performing another comparison between the entity-specific designation of the role and standardized designations of the role included in the preliminary match corpus, analytics platform 220 increases accuracy of role matching.

In other words, the word "analyst" may not have been of significance when determining the preliminary match corpus because multiple different roles may include the word "analyst" (e.g., a financial analyst, a weather analyst, a legal analyst, a sports analyst, a political analyst, etc.). However, the word "analyst" may be of significance when determining a particular standardized designation of the role that corresponds to the entity-specific designation of the role. As an example, a financial analyst may be associated with different tasks than as compared to a financial manager, a financial officer, a financial consultant, and/or the like.

In some implementations, analytics platform 220 may determine a particular standardized designation of the role that corresponds to the entity-specific designation of the role. For example, analytics platform 220 may, after comparing respective vectors using the preliminary match corpus, determine a standardized designation of the role that includes the greatest similarity value as compared to similarity values of other standardized designations of roles.

In some implementations, analytics platform 220 may compare a modified vector associated with the entity-specific designation of the role (e.g., with removed words, such as the seniority level identifier) and vectors of standardized designations, and determine a set of similarity values. Additionally, analytics platform 220 may compare an unmodified vector (e.g., including the words associated with the seniority level, and/or the like) associated with the entity-specific designation of the role and vectors of standardized designations, and determine a set of similarity values. Additionally, analytics platform 220 may compare the similarity values, and determine a standardized designation based on comparing the similarity values (e.g., may weigh similarity values, may score similarity values, and/or the like).

In this way, analytics platform 220 may determine a standardized designation of the role, and may identify a set of tasks that correspond to the role using the standardized designation, as described below. By determining the standardized designation of the role, analytics platform 220 may identify the set of tasks. For example, analytics platform 220 might not be capable of identifying a set of tasks using an entity-specific designation of the role. In other words, database server 240 (or another data source) might not store information that identifies a set of tasks associated with an entity-specific designation of the role, and may store information that identifies a set of tasks associated with a standardized designation of the role.

As further shown in FIG. 4, process 400 may include receiving information associated with a set of underlying skills, abilities, and/or knowledge associated with the role (block 440). For example, analytics platform 220 may receive information that identifies underlying skills, abilities, and/or knowledge associated with the role.

In some implementations, the information associated with the set of underlying skills, abilities, and/or knowledge may include information that identifies skills, abilities, knowledge, certifications, qualifications, employment status, degrees, training, experience, and/or the like. For example, the information associated with the set of underlying skills, abilities, and/or knowledge may identify a particular skill set and/or a set of qualifications of personnel that perform the role.

In some implementations, the information associated with the set of underlying skills, abilities, and/or knowledge may be associated with a particular entity (e.g., an individual). Alternatively, the information associated with the set of underlying skills, abilities, and/or knowledge may be associated with a set of entities (e.g., a group of individuals) that perform the role.

In this way, analytics platform 220 may receive the information, and determine a role automation score using the information and a model, as described in more detail in connection with block 470.

As further shown in FIG. 4, process 400 may include receiving information associated with a set of tasks that is associated with the standardized designation of the role (block 450). For example, analytics platform 220 may receive, from database server 240, information associated with a set of tasks that corresponds to the role that is identified by the entity-specific designation and/or the standardized designation.

In some implementations, analytics platform 220 may receive information that identifies the set of tasks based on a request. For example, analytics platform 220 may provide, to database server 240, a request for the information associated with the set of tasks associated with the standardized designation of the role after determining the standardized designation of the role. Alternatively, analytics platform 220 may receive information associated with the set of tasks based on a time frame, based on an event, and/or the like. In some implementations, analytics platform 220 may receive hundreds, thousands, and/or the like, of textual descriptions of tasks associated with the role (e.g., a quantity of textual descriptions that may not be capable of being processed manually).

In some implementations, the information associated with the set of tasks may correspond to textual descriptions of the set of tasks. As examples, tasks might include textual descriptions such as "recruit, hire, train, and supervise staff," "use network computer-aided (CAD) software packages to optimize network designs," "determine whether emergency or auxiliary systems will be needed to keep properties heated or cooled in extreme weather conditions," "implement policies regarding operation of the company," and/or the like.

In some implementations, analytics platform 220 may use a set of NLP techniques to process the textual descriptions of the set of tasks. For example, analytics platform 220 may remove stop words, expand acronyms, remove words that include particular part-of-speech (POS) tags, remove white space, remove parentheses, and/or the like. In this way, analytics platform 220 may more efficiently process the textual descriptions of the set of tasks than as compared to if the NLP technique is not performed. In this way, analytics platform 220 may conserve processor and/or memory resources.

In some implementations, analytics platform 220 may generate a set of task components using a textual description of a task. For example, a textual description of a task may include a set of tasks components. In some implementations, a task component may refer to an n-gram (e.g., where n≥1, such as a unigram, a bigram, a trigram, a four-gram, a five-gram, a ten-gram, etc.). In some implementations, an n-gram may refer to a sequence of n words from a given sequence of text. As examples, task components may include "error_process," "efficiency_reduce," "machines_improve," mail_parcel_sorting," "data_determine_correlation_technique," and/or the like. In some implementations, analytics platform 220 may generate hundreds, thousands, millions, etc. of task components using textual descriptions of the set of tasks.

In some implementations, analytics platform 220 may generate a matrix (e.g., a document-term matrix, a term-document matrix, and/or the like) based on the set of task components. For example, analytics platform 220 may generate a matrix that includes information associated with the set of task components and information that identifies the frequency of the task components in relation the textual descriptions of the set of tasks. As an example, the matrix may include a set of rows that correspond to the set of task components, and may include a set of columns that corresponds to a number of times a task component appears in the textual descriptions of the set of tasks.

In some implementations, analytics platform 220 may modify the matrix using a technique. For example, analytics platform 220 may modify the matrix using a term frequency-inverse document frequency (tf-idf) technique, a latent semantic analysis technique, a Kullback-Leibler divergence technique, a vector space modelling technique, a latent semantic indexing technique, a latent Dirichlet allocation technique, and/or the like. In some implementations, the modified matrix may include less task components than as compared to the un-modified matrix. That is, analytics platform 220 may remove, using the technique, task components that might be of less importance than as compared to other task components when performing task comparison (e.g., correlating tasks and automation-capable tasks, as described elsewhere herein).

In this way, analytics platform 220 may receive information that identifies a set of tasks associated with the standardized designation of the role, and compare the set of tasks and a set of automation-capable tasks, as described below.

As further shown in FIG. 4, process 400 may include comparing the information associated with the set of tasks and information associated with a set of automation-capable tasks (block 460). For example, analytics platform 220 may compare information associated with the set of tasks and information associated with a set of automation-capable tasks, and determine a set of automation scores for the set of tasks. As used herein, the process of comparing information associated with the set of tasks and information associated with a set of automation-capable tasks may be referred to as "task comparison."

In some implementations, analytics platform 220 may perform task comparison based on an input received from user device 210. Additionally, or alternatively, analytics platform 220 may perform task comparison based on a time frame, based on an event, based on generating the matrix as described above in connection with block 450, and/or the like. Additionally, or alternatively, analytics platform 220 may perform task comparison after receiving information that identifies a set of automation-capable tasks, as described below.

In some implementations, analytics platform 220 may receive, from external server 230, database server 240, and/or another external data source, information associated with a set of automation-capable tasks. In some implementations, an automation-capable task may refer to a task that is capable of being performed, capable of being augmented, and/or the like, using automation technology (e.g., automation devices and/or platforms including hardware, firmware, software, and/or a combination thereof).

In some implementations, analytics platform 220 may receive textual descriptions of automation-capable tasks. Additionally, analytics platform 220 may perform a set of NLP techniques using the textual descriptions of the set of automation-capable tasks to prepare the textual descriptions of the set of automation-capable tasks for processing, such as by removing stop words, expanding acronyms, and/or the like.

In some implementations, analytics platform 220 may generate a set of automation-capable task components using the information associated the set of automation-capable tasks. For example, analytics platform 220 may generate a set of automation-capable task components in a similar manner as described above in connection with block 450 regarding task components.

In some implementations, analytics platform 220 may generate a matrix using the set of automation-capable task components, and may modify the matrix using a technique in a similar manner as described above in connection with block 450 regarding the matrix associated with the set of task components. In this way, analytics platform 220 may compare task components and automation-capable task components using the matrices, as described below.

In some implementations, analytics platform 220 may, using the respective matrices, compare the set of task components and the set of automation-capable task components. In some implementations, analytics platform 220 may, using the matrices, generate vectors for the set of task components and vectors for the set of automation-capable task components. In this way, analytics platform 220 may compare the vectors in a similar manner as described elsewhere herein.

In some implementations, analytics platform 220 may identify the set of tasks that is associated with the standardized designation of the role. Additionally, or alternatively, analytics platform 220 may identify a set of task components that is associated with an individual task of the set of tasks. Additionally, or alternatively, analytics platform 220 may, for each task component of the set of task components, determine a set of similarity values between the task component and the set of automation-capable task components by using and comparing vectors.

In some implementations, analytics platform 220 may identify the greatest similarity value that is associated with a task component, and assign the similarity value to the task component. In some implementations, analytics platform 220 may determine similarity values for each task component of the set of task components, and determine automation scores using the similarity values, as described below.

As further shown in FIG. 4, process 400 may include determining a set of automation scores for the set of tasks based on comparing the information associated with the set of tasks and the information associated with the set of automation-capable task components (block 470). For example, analytics platform 220 may determine a set of automation scores for the set of tasks associated with the standardized designation of the role.

In some implementations, analytics platform 220 may determine a set of automation scores for the set of tasks based on determining the similarity values between the set of task components and the set of automation-capable task components. Additionally, or alternatively, analytics platform 220 may determine the set of automation scores based on an input received from user device 210, based on a time frame, based on an event, and/or the like.

In some implementations, an automation score for a task may be indicative of the capability, potential, efficacy, viability, availability, propensity, and/or the like, of the task being automated through the usage of automation technology. For example, an automation score, of a task, that satisfies a threshold score may indicate that the task is capable of being automated through the usage of automation technology.

In some implementations, analytics platform 220 may determine an automation score for a task using a model. For example, analytics platform 220 may identify a set of task components of the task, and identify a set of similarity values that correspond to the task components (e.g., similarity values determined in connection with block 460). Additionally, analytics platform 220 may input information that identifies the set of similarity values, a number of task components of the task, and/or the like, into a model. Additionally, analytics platform 220 may determine an automation score based on an output of the model.

In some implementations, analytics platform 220 may determine a set of automation scores for a set of tasks associated with a role, such as the role that is identified by the standardized designation and/or the entity-specific designation. For example, assume that a role is associated with fifteen tasks. In this case, analytics platform 220 may determine fifteen automation scores that correspond to the respective tasks of the role.

In some implementations, analytics platform 220 may determine a role automation score based on the set of automation scores of the set of tasks. For example, a role automation score may correspond to a probability, viability, capability, and/or the like, of a role being automated and/or being augmented through the usage of automation technology. In some implementations, analytics platform 220 may determine a role automation score using the set of automation scores, such as by adding the automation scores, averaging the automation scores, and/or the like. Additionally, or alternatively, analytics platform 220 may apply weight values to the automation scores, may rank the automation scores and select particular scores, and/or the like. Additionally, or alternatively, analytics platform 220 may input the set of automation scores into a model, and determine a role automation score based on an output of the model.

In some implementations, analytics platform 220 may determine a role automaton score based on information associated with a set of underlying skills, abilities, and/or knowledge associated with the role. For example, analytics platform 220 may determine a role automation score based on the information that was received in connection with block 440. In some implementations, analytics platform 220 may input the information into a model, and determine a role automation score based on an output of the model.

In this way, analytics platform 220 may determine automation scores for tasks, and provide information associated with the automation scores to permit and/or cause actions to be performed, as described below.

As further shown in FIG. 4, process 400 may include providing information associated with the set of automation scores associated with the set of tasks to permit and/or cause an action to be performed (block 480). For example, analytics platform 220 may provide information associated with the set of automation scores and/or the role automation score to permit and/or cause an action to be performed based on the set of automation scores.

In some implementations, the action may correspond to user device 210 providing, for display, information associated with the set of automation scores. For example, analytics platform 220 may provide, to user device 210, information associated with the set of automation scores. In some implementations, analytics platform 220 may determine automation scores for sets of tasks associated with hundreds, thousands, etc. of roles associated with an entity. As such, an operator of user device 210 may interact with user device 210 to identify particular tasks that are capable of being automated, that might be automated, that might benefit from automation, etc.

In some implementations, analytics platform 220 may provide, to user device 210, a user interface to output the standardized designation of the role. Additionally, or alternatively, analytics platform 220 may provide a user interface to output the set of automation scores. In other words, analytics platform 220 may provide information associated with an interface that permits user device 210 to provide, for display, the information associated with the interface.

In some implementations, the action may correspond to providing a recommendation for a particular automation technology. For example, particular automation technologies (e.g., offered by third-party vendors) might be capable of performing particular tasks. In some implementations, analytics platform 220 may train a model using information that identifies tasks associated with the particular automation technologies. For example, analytics platform 220 may train a model using known automation technologies and known sets of tasks. Additionally, analytics platform 220 may use the model (e.g., input information associated with a set of tasks associated with a role) to determine a particular automation technology that might be capable of performing the tasks associated with the role.

In some implementations, analytics platform 220 may determine a category associated with a task when determining the particular automaton technology. For example, analytics platform 220 may implement an NLP technique to identify a nature of a task in order to categorize the tasks such that an automation technology can be identified. For example, a nature of a task may correspond to, as examples, "know/learn," "reason/plan," "sense/perceive," or "act/communicate." It should be understood that other natures and/or categories of tasks are possibilities. In some implementations, analytics platform 220 may identify, for each task of the role, a nature of the task, and then determine a particular automation technology based on the respective natures of the tasks. For example, analytics platform 220 may identify an automaton technology that corresponds to and/or is capable of performing tasks based on the nature of the tasks.

Additionally, analytics platform 220 may provide, to user device 210, information associated with the particular automation technology. Additionally, or alternatively, analytics platform 220 may automatically cause a product and/or service associated with the automation technology to be acquired, purchased, and/or the like.

In some implementations, the action may correspond to sending a message (e.g., an email message, a short message service (SMS) message, and/or the like), coordinating calendar applications associated with user devices 210, scheduling a meeting to discuss an automation technology and/or automation scores, identifying a set of candidates for a particular role, modifying a job schedule to accommodate the usage of automation technology, ordering a product and/or service associated with an automation technology vendor, and/or the like.

In some implementations, the action may correspond to automatically implementing automation technology. For example, analytics platform 220 may cause an automation technology to be implemented in association with a role. In some implementations, analytics platform 220 may provide, to a user device 210 associated with an individual associated with the role, information that identifies that the automation technology has been implemented. Additionally, or alternatively, analytics platform 220 may provide information that identifies the set of tasks that the automation technology is capable of performing and/or augmenting. In this way, a user may identify that the set of tasks are being performed, such that the user may perform other tasks.

In this way, some implementations described herein provide an analytics platform 220 to receive information that identifies a designation of a role for which automation capability is to be analyzed, match the designation of the role and another designation of the role, and identify a set of tasks associated with the role based on matching the designations. Additionally, some implementations described herein permit analytics platform 220 to determine a set of tasks associated with the role, and determine a set of automation scores of the set of tasks.

In this way, some implementations described herein permit analytics platform 220 to improve accuracy of automation scores, remove subjectivity associated with determining automation scores, increase the speed in which automation scores can be determined, and/or the like. In this way, some implementations described herein conserve device computing resources and/or conserve network resources by reducing error associated with determining automation scores, reducing an amount of manual effort associated with determining automation scores, reducing an amount of time associated with determining automation scores, and/or the like.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, and/or the like.

Certain user interfaces have been described herein and/or shown in the figures. A user interface may include a graphical user interface, a non-graphical user interface, a text-based user interface, and/or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A device, comprising:
one or more processors to:
receive a textual description for an entity-specific designation of a role;
process the textual description to generate information associated with the entity-specific designation of the role,
the textual description being processed using a first natural language processing technique to automatically remove a word from the textual description based on the word being associated with multiple different roles;
compare the information associated with the entity-specific designation of the role and information associated with a set of standardized designations of a set of roles;
determine a standardized designation of the role, of the set of standardized designations, that corresponds to the entity-specific designation of the role after comparing the information associated with the entity-specific designation of the role and the information associated with the set of standardized designations of the set of roles;
receive information associated with a set of tasks that is associated with the role after determining the standardized designation of the role that corresponds to the entity-specific designation of the role;
compare the information associated with the set of tasks and information associated with a set of automation-capable tasks;
determine a set of automation scores, associated with the set of tasks, based on comparing the information associated with the set of tasks and the information associated with the set of automation-capable tasks;
provide information associated with the set of automation scores to permit an action to be performed based on the set of automation scores;
determine a category for each task, of the set of tasks, based on using a second natural language processing technique to identify a nature of a respective task, of the set of tasks;
identify an automation technology that corresponds to each respective task, of the set of tasks, based on the category determined for the respective task and a capability of the automation technology; and
provide information that identifies the automation technology that corresponds to each respective task.

2. The device of claim 1, where the one or more processors are further to:
determine a similarity value between a first vector associated with the entity-specific designation of the role and a second vector associated with the standardized designation of the role; and
where the one or more processors, when determining the standardized designation of the role that corresponds to the entity-specific designation of the role, are to:

determine the standardized designation of the role based on the similarity value.

3. The device of claim 1, where the one or more processors are further to:
determine a subset of the set of standardized designations, of the set of roles, after comparing the information associated with the entity-specific designation of the role and the information associated with the set of standardized designations of the set of roles and using a first vector associated with the entity-specific designation of the role;
compare a second vector, associated with the entity-specific designation of the role, and a set of vectors that corresponds to the subset of the set of standardized designations of the set of roles; and
where the one or more processors, when determining the standardized designation of the role, are to:
determine the standardized designation of the role after comparing the second vector and the set of vectors.

4. The device of claim 1, where the one or more processors are further to:
generate a set of task components based on the information associated with the set of tasks; and
where the one or more processors, when comparing the information associated with the set of tasks and the information associated with the set of automation-capable tasks, are to:
compare the information associated with the set of tasks and the information associated with the set of automation-capable tasks using the set of task components.

5. The device of claim 1, where the one or more processors are further to:
input a set of similarity values, that corresponds to the set of tasks and the set of automation-capable tasks, into a model;
determine an output of the model based in inputting the set of similarity values into the model; and
where the one or more processors, when determining the set of automation scores, are to:
determine the set of automation scores based on the output of the model.

6. The device of claim 1, where the one or more processors are further to:
generate a term-document matrix using the information associated with the set of tasks; and
where the one or more processors, when determining the set of automation scores associated with the set of tasks, are to:
determine the set of automation scores using the term-document matrix.

7. The device of claim 1, where the one or more processors are further to:
provide a user interface to output the standardized designation of the role.

8. The device of claim 1, where the one or more processors are further to:
provide a user interface to output the set of automation scores.

9. The device of claim 1, where the one or more processors are further to:
automatically cause an action to be performed, based on the set of automation scores, the action including at least one of:
making a request for a product and/or service associated with the automation technology, or
making a modification to a budget to accommodate the automation technology.

10. A method, comprising:
receiving, by a device, a textual description for a first designation of a role;
processing, by the device, the textual description to generate information associated with the first designation of the role,
the textual description being processed using a first natural language processing technique to automatically remove a word from the textual description based on the word being associated with multiple different roles;
comparing, by the device, the information associated with the first designation of the role and information associated with a set of other designations of a set of other roles;
determining, by the device, a second designation of the role that corresponds to the first designation of the role after comparing the information associated with the first designation of the role and the information associated with the set of other designations of the set of other roles;
receiving, by the device, information associated with a set of tasks that is associated with the second designation of the role after determining the second designation of the role that corresponds to the first designation of the role;
comparing, by the device, the information associated with the set of tasks and information associated with a set of automation-capable tasks;
determining, by the device, a set of automation scores, associated with the set of tasks, based on comparing the information associated with the set of tasks and the information associated with the set of automation-capable tasks; and
providing, by the device, information associated with the set of automation scores to permit an action to be performed based on the set of automation scores;
determining, by the device, a category for each task, of the set of tasks, based on using a second natural language processing technique to identify a nature of a respective task, of the set of tasks;
identifying, by the device, an automation technology that corresponds to each respective task, of the set of tasks, based on the category determined for the respective task and a capability of the automation technology; and
providing, by the device, information that identifies the automation technology that corresponds to each respective task.

11. The method of claim 10, further comprising:
generating a vector that corresponds to the first designation of the role;
generating a set of other vectors associated with the set of other designations of the set of other roles; and
where comparing the information associated with the first designation of the role and the information associated with the set of other designations of the set of other roles comprises:
comparing the information associated with the first designation of the role and the information associated with the set of other designations of the set of other roles using the vector and the set of other vectors.

12. The method of claim 10, further comprising:
generating a first vector that corresponds to a first set of words of the first designation of the role;

identifying a subset of the set of other designations of the set of other roles using the first vector;
generating a second vector that corresponds to a second set of words of the first designation of the role,
the second set of words being different than the first set of words;
comparing the second vector and other vectors of the subset of the set of other designations; and
where determining the second designation of the role that corresponds to the first designation of the role comprises:
determining the second designation of the role after comparing the second vector and the other vectors of the subset of the set of other designations.

13. The method of claim 10, further comprising:
generating a set of task components using the information associated with the set of tasks; and
where comparing the information associated with the set of tasks and the information associated with the set of automation-capable tasks comprises:
comparing the information associated with the set of tasks and the information associated with the set of automation-capable tasks using the set of task components.

14. The method of claim 10, further comprising:
generating a matrix using the information associated with the set of tasks; and
where comparing the information associated with the set of tasks and the information associated with the set of automation-capable tasks comprises:
comparing the information associated with the set of tasks and the information associated with the set of automation-capable tasks using the matrix.

15. The method of claim 10, further comprising:
determining a set of similarity values that correspond to the set of tasks and the set of automation-capable tasks; and
where determining the set of automation scores comprises:
determining the set of automation scores based on the set of similarity values.

16. A non-transitory computer-readable medium storing instructions, the instructions comprising:
one or more instructions that, when executed by one or more processors, cause the one or more processors to:
receive a textual description for a first designation of a role;
process the textual description to generate information associated with the first designation of the role,
the textual description being processed using a first natural language processing technique to automatically remove a word from the textual description based on the word being associated with multiple different roles;
compare the information associated with the first designation of the role and information associated with a set of other designations of a set of other roles;
determine a second designation of the role that corresponds to the first designation of the role after comparing the information associated with the first designation of the role and the information associated with the set of other designations of the set of other roles;
receive information associated with a set of tasks that is associated with the second designation of the role after determining the second designation of the role that corresponds to the first designation of the role;
compare the information associated with the set of tasks and information associated with a set of automation-capable tasks;
determine a set of automation scores, associated with the set of tasks, based on comparing the information associated with the set of tasks and the information associated with the set of automation-capable tasks; and
provide information associated with the set of automation scores to permit an action to be performed based on the set of automation scores;
determine a category for each task, of the set of tasks, based on using a second natural language processing technique to identify a nature of a respective task, of the set of tasks;
identify an automation technology that corresponds to each respective task, of the set of tasks, based on the category determined for the respective task and a capability of the automation technology; and
provide information that identifies the automation technology that corresponds to each respective task.

17. The non-transitory computer-readable medium of claim 16, where the one or more instructions, when executed by the one or more processors, further cause the one or more processors to:
generate a vector that corresponds to the first designation of the role;
generate a set of other vectors that corresponds to the set of other designations of the set of other roles; and
where the one or more instructions, that cause the one or more processors to compare the information associated with the first designation of the role and the information associated with the set of other designations of the set of other roles, cause the one or more processors to:
compare the information associated with the first designation of the role and the information associated with the set of other designations of the set of other roles using the vector and the set of other vectors.

18. The non-transitory computer-readable medium of claim 16, where the one or more instructions, when executed by the one or more processors, further cause the one or more processors to:
generate a set of task components using the information associated with the set of tasks;
determine a set of similarity values associated with the set of task components and the set of automation-capable tasks; and
where the one or more instructions, that cause the one or more processors to determine the set of automation scores, cause the one or more processors to:
determine the set of automation scores using the set of similarity values.

19. The non-transitory computer-readable medium of claim 16, where the one or more instructions, when executed by the one or more processors, further cause the one or more processors to:
compare a first vector, associated with the first designation of the role, and the set of other designations of the set of other roles;
determine a subset of the set of other designations of the set of other roles based on comparing the first vector and the set of other designations;

compare a second vector, associated with the first designation of the role, and the subset of the set of other designations of the set of other designations; and where the one or more instructions, that cause the one or more processors to determine the second designation of the role, cause the one or more processors to:

determine the second designation of the role after comparing the second vector and the subset of the set of other designations of the set of other designations.

20. The method of claim 10, further comprising:
automatically causing an action to be performed, based on the set of automation scores, the action including at least one of:
  making a request for a product and/or service associated with the automation technology, or
  making a modification to a budget to accommodate the automation technology.

* * * * *